United States Patent Office 2,949,491
Patented Aug. 16, 1960

2,949,491

SELECTIVE HYDROGENATION OF CHLOROBENZENES

John T. Rucker, Lewiston, N.Y., assignor to Hooker Chemical Corporation, a corporation of New York No Drawing. Filed Nov. 29, 1957, Ser. No. 699,511

11 Claims. (Cl. 260—650)

This invention relates to a method of reducing the chlorine content of aromatic ring chlorine compounds.

The present invention resides in a process in which the dechlorination is effectuated by a selective hydrogenation of a chlorobenzene. The degree of dehalohydrogenation can be by this invention, quantitatively controlled in a step-wise fashion by continuously fractionating off the immediate reaction product as hydrogenation proceeds. By this particular selective hydrogenation process, more useful chlorobenzene compounds can be produced directly without necessitating a complete dechlorination beforehand of the ring. Thus, trichlorobenzenes can be produced in substantially 100 percent yields from tetrachlorobenzenes, dichlorobenzenes in substantially 100 percent yields from trichlorobenzenes, and monochlorobenzenes in substantially 100 percent yields from dichlorobenzenes. Such a precise step-wise control has not heretofore been known or used in hydrogenation of chlorobenzenes.

It is an object of this invention to provide a selective dehalogenation process of chlorobenzenes in the presence of hydrogen and a catalyst.

Chlorination of benzene produces mixtures of useful and less useful isomers. Another object is to recover the chlorine value (as HCl) from the less useful isomers and simultaneously produce lower chlorobenzenes which can be re-chlorinated to obtain useful products.

A further object is to produce certain useful chlorobenzenes in high yields which are not readily attainable by other procedures.

An additional object is to provide a method of dechlorination which is easily adaptable to present commercial processes and systems.

Each of these desired results may be accomplished more accurately, more rapidly, and more economically by the selective removal of chlorine by the process of this invention.

The reaction is preferably carried out in the liquid phase, at temperatures from 100 degrees centigrade to reflux, with a catalyst of about 0.5 percent of 5 percent palladium on charcoal powder, at atmospheric pressure, and with vigorous agitation. Hydrogen is introduced at a moderate rate, the excess $H_2$ and evolved HCl passing out through a reflux condenser to a water scrubber or other means for recovering HCl values. When conducted batch-wise, the products are a mixture of lower chlorobenzenes which may be filtered free of catalyst and separated by fractionation. The catalyst can be re-used.

Since the products are more volatile than the starting material, it is easy to conduct the reaction step by step in a quantitative way by continuously fractionating off the desired product as formed. Thus, in the following sequence any desired lighter product may be obtained from any heavier product by controlling the temperature of take off.

$$C_6H_2Cl_4 \rightarrow C_6H_3Cl_3 \rightarrow C_6H_4Cl_2 \rightarrow C_6H_5Cl \rightarrow C_6H_6$$

This is possible because each of the chlorobenzenes is reduced at a rate approximately directly proportional to its concentration. By continuous addition of reactants the process can thus be conducted in a completely continuous manner.

It will become evident from examples to be shown that the reduction is quite selective with respect to the particular isomers formed so that certain isomers in particular can be produced directly in fairly good purity.

The catalyst used is a noble metal selected from group VIII of the periodic table, which has an atomic number greater than 43. The metals of this class are ruthenium, rhodium, palladium, osmium, iridium and platinum. Known hydrogenation catalysts investigated such as iron, metallic zinc, Raney nickel, cobalt, activated carbon and ultraviolet light, have not been found to be adaptable to the method of the present invention because none of these materials, which are generally considered to be hydrogenation catalysts, exhibited the necessary requirements of efficiency in catalyzing the hydrogen reduction. Further, some of these materials are very susceptible to catalyst poisoning and chemical attack by the chemicals present during the hydrogenation.

The catalysts to be used in the method of this invention are most effective when they are deposited on an inert carrier such as activated charcoal or kieselguhr. We prefer to use a catalyst comprising a carrier of powdered charcoal with palladium catalyst deposited thereon in the amount of about 0.5 percent of 5 percent palladium. After batchwise treatment of the commercial compound, the catalyst on the inert carrier, or deposited catalyst, is removed from the liquid system by filtration, or by settling and decantation, or by other suitable mechanical means; or, alternatively, the liquid products may be removed by fractionation leaving behind a "heel" of liquid containing the catalyst ready for re-use. The palladium catalyst used in our process is entirely practical and economical. Of course, the quantity of the catalyst will depend on the speed of reaction desired, and can be varied accordingly. The catalyst is used in small concentrations, is rugged and durable, and can be repeatedly re-used or continuously used in a continuous process. The use of the particular catalyst of this invention is critical to the invention in that it efficiently promotes the reaction in the liquid phase, has a very long useful life, and it does not react with hydrogen chloride or chlorobenzenes at process temperatures.

Selectivity in removing specific positioned chlorine atoms in chlorobenzenes is illustrated, for example, as follows:

*Example 1*

1.9 moles of 100 percent 1,2,3-trichlorobenzene were heated in a 500 cc. round bottom three neck glass flask. The flask was equipped with a stirrer, a gas inlet tube, a thermometer, a water cooled reflux condenser with a gas exit line leading into a water scrubber for absorbing hydrogen chloride. 1.7 grams of 5 percent palladium or a noble metal selected from group VIII of the periodic table, having an atomic number greater than 43 on carbon powder, was then added; the flow of hydrogen was started at a moderate rate and the agitator started. The temperature was gradually raised by means of an electric heater to about 175 degrees centigrade. Hydrogen chloride evolution was followed by a periodic titration of the water scrubber contents.

After 7 hours, 0.9 mole of hydrogen chloride evolved out. The reaction mixture was then purged with nitrogen to rid the system of hydrogen; the catalyst removed by filtration and the liquid product fractionated. The resultant product was 1.1 moles of pure 1,2,3-trichlorobenzene, 0.1 mole of monobenzene, and 0.7 mole of dichlorobenzene consisting of:

95.4 percent ortho
4.6 percent meta
And less than 0.1 percent para.

This reaction shows that selective hydrogenation of 1,2,3-trichlorobenzene yields dichlorobenzene in almost exclusively the ortho isomer.

*Example 2*

Under conditions similar to those set out in Example 1, 1.8 moles of 1,2,3,4-tetrachlorobenzene was heated and hydrogenated for 4 hours at 185 degrees centigrade. 1.0 mole of residual tetra plus 0.7 mole of trichlorobenzene resulted. The content of the trichlorobenzene product was:

|  | Percent |
|---|---|
| 1,2,3-tri | 98.4 |
| 1,2,4-tri | 1.6 |
| 1,3,5-tri | Less than 0.1 |

This example illustrates that the trichlorobenzene produced by selectively hydrogenating 1,2,3,4-tetrachlorobenzene is almost exclusively 1,2,3-trichlorobenzene.

*Example 3*

Under conditions similar to those set out in Example 1:

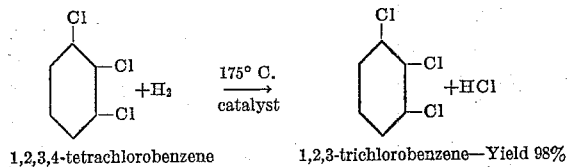

1,2,3,4-tetrachlorobenzene     1,2,3-trichlorobenzene—Yield 98%

*Example 4*

Under conditions similar to those set out in Example 1:

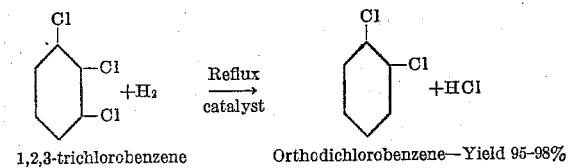

1,2,3-trichlorobenzene     Orthodichlorobenzene—Yield 95-98%

*Example 5*

Under conditions similar to those set out in Example 1:

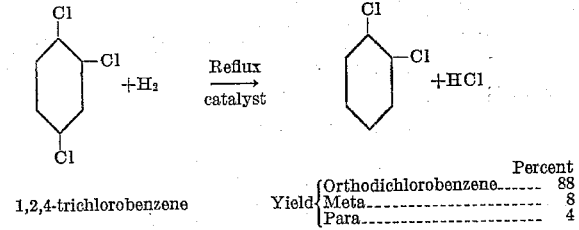

1,2,4-trichlorobenzene     Yield {Orthodichlorobenzene 88 / Meta 8 / Para 4} Percent

*Example 6*

Under conditions similar to those set out in Example 1:

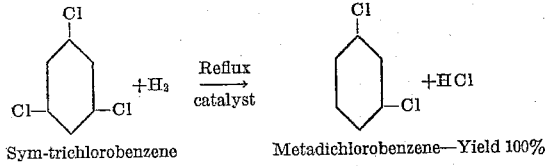

Sym-trichlorobenzene     Metadichlorobenzene—Yield 100%

To illustrate the step by step procedure of our process the following run was made.

*Example 7*

5 moles of 1,3,5-trichlorobenzene was reacted with hydrogen for 7 hours at 205 degrees centigrade. A catalyst of palladium on activated carbon was used. A product containing 3.3 moles of residual trichlorobenzene, 1.7 moles of dichlorobenzene, and a small trace of monochlorobenzene resulted. The dichlorobenzene consisted of 100 percent meta dichlorobenzene.

This run was made with continuous removal of dichlorobenzene by means of a fractionating column. The dichlorobenzene product consisted exclusively of the meta isomer.

The catalyst used in this example was re-used in the run shown in Example 5. No loss of activity was observed.

The examples of the process of this invention which have been described in the foregoing specification, have been given for purposes of illustration, not limitation. Many other uses and modifications will naturally suggest themselves to those skilled in the art, based on the disclosure of our basic discovery. These are intended to be comprehended within the scope of my invention.

I claim:

1. A process for the selective de-chlorination of a chlorobenzene mixture, which comprises bubbling hydrogen at a moderate rate into a liquid mixture comprising said chlorobenzene mixture, in the presence of a catalyst consisting of a group VIII noble metal having an atomic number greater than forty-three, and maintaining the starting mixture between 100 degrees centigrade and reflux temperature.

2. A process for the progressive de-chlorination of a chlorobenzene compound which comprises bubbling hydrogen at a moderate rate into a liquid mixture comprising said chlorobenzene, in the presence of a catalyst, said catalyst consisting of a group VIII noble metal having an atomic number greater than 43, in the absence of a solvent, and maintaining the liquid mixture between 100 degrees centigrade and reflux temperature.

3. The process of claim 2 in which the catalyst consists of 0.5 percent of a 5 percent noble metal of group VIII having an atomic number greater than 43, said catalyst deposited on carbon powder.

4. The process for the selective hydrogenation of chlorobenzenes which comprises bubbling hydrogen at a moderate rate into the chlorobenzene solution, in the presence of a 0.5 percent of 5 percent palladium catalyst, in the absence of a solvent, and maintaining the liquid mixture between 100 degrees centigrade and reflux temperature.

5. The process for the selective hydrogenation of chlorobenzenes which comprises bubbling hydrogen at a moderate rate into the chlorobenzene solution, in the presence of a 0.5 percent of 5 percent palladium catalyst, in the absence of a solvent, maintaining the liquid mixture between 100 degrees centigrade and reflux temperature, and continuously fractionating off the immediate product.

6. The process for the selective hydrogenation of chlorobenzenes which comprises bubbling hydrogen at a moderate rate into a chlorobenzene solution, in the presence of a 0.5 percent of 5 percent palladium catalyst deposited on charcoal powder, the excess hydrogen and hydrogen chloride passing out through a reflux condenser to a water scrubber where the hydrogen chloride is absorbed, maintaining the liquid mixture between 100 degrees centigrade and reflux temperature, and continuously fractionating off the immediate product.

7. A process for the production of 1,2,3-trichlorobenzene which comprises hydrogenating 1,2,3,4-tetrachlorobenzene at a temperature of about one hundred degrees centigrade to reflux in the presence of a catalyst consisting of a group VIII noble metal having an atomic number greater than forty-three.

8. A process for the production of 1,2,3-trichlorobenzene which comprises passing hydrogen into a 1,2,3,4-tetrachlorobenzene solution at a temperature from about one hundred degrees centigrade to about one hundred and eighty-five degrees centigrade in the presence of a catalyst consisting of a group VIII noble metal having an atomic number greater than forty-three.

9. A process for the production of 1,2,3-trichlorobenzene which comprises, passing hydrogen into a 1,2,3,4- tetrachlorobenzene solution in the presence of a catalyst consisting of a group VIII noble metal having an atomic number greater than forty-three, maintaining said liquid at from about one hundred and seventy-five degrees centigrade to one hundred and eighty-five degrees centigrade, and continuously collecting off the immediate product.

10. A process for the production of 1,2,3-trichlorobenzene which comprises, passing hydrogen at a moderate rate into a 1,2,3,4-tetrachlorobenzene solution, in the presence of a catalyst consisting of a group VIII noble metal having an atomic number greater than forty-three, maintaining said liquid at from about one hundred and seventy-five degrees centigrade to one hundred and eighty-five degrees centigrade, and continuously collecting off the immediate product.

11. A process for the selective dechlorination of 1,2,3,4-tetrachlorobenzene to form 1,2,3-trichlorobenzene, which comprises bubbling hydrogen at a moderate rate into a 1,2,3,4-tetrachlorobenzene solution in the presence of a catalyst, said catalyst consisting of a group VIII noble metal having an atomic number greater than forty-three, in the absence of a solvent, and maintaining the liquid mixture at from about one hundred and seventy-five degrees centigrade to one hundred and eighty-five degrees centigrade.

References Cited in the file of this patent

UNITED STATES PATENTS 2,826,617     Redman et al. _____ Mar. 11, 1958

OTHER REFERENCES

Sabatier: "Catalysis in Organic Chemistry," pp. 148–149 (1923).